United States Patent
Yermakov et al.

(10) Patent No.: US 9,081,961 B2
(45) Date of Patent: Jul. 14, 2015

(54) SYSTEM AND METHOD FOR ANALYZING MALICIOUS CODE USING A STATIC ANALYZER

(75) Inventors: Alexander Yermakov, Ashkelon (IL); Mark Kaplan, Modiin (IL)

(73) Assignee: Trustwave Holdings, Inc., Chicago, IL (US)

( * ) Notice: Subject to any disclaimer, the term of this patent is extended or adjusted under 35 U.S.C. 154(b) by 936 days.

(21) Appl. No.: 13/156,971

(22) Filed: Jun. 9, 2011

(65) Prior Publication Data

US 2011/0307956 A1    Dec. 15, 2011

Related U.S. Application Data

(60) Provisional application No. 61/353,957, filed on Jun. 11, 2010.

(51) Int. Cl.
| | |
|---|---|
| *G06F 21/56* | (2013.01) |
| *G06F 17/22* | (2006.01) |
| *H04L 29/06* | (2006.01) |
| *G06F 21/55* | (2013.01) |

(52) U.S. Cl.
CPC ............ *G06F 21/563* (2013.01); *G06F 17/227* (2013.01); *G06F 21/56* (2013.01); *H04L 63/0227* (2013.01); *G06F 21/554* (2013.01); *H04L 63/1408* (2013.01); *H04L 63/168* (2013.01)

(58) Field of Classification Search
CPC . G06F 17/227; G06F 17/2258; G06F 21/554; G06F 21/56; G06F 21/563; H04L 63/0227; H04L 63/168; H04L 63/1408
USPC .............................................. 726/4, 22, 24, 2
See application file for complete search history.

(56) References Cited

U.S. PATENT DOCUMENTS

| | | | |
|---|---|---|---|
| 5,448,740 A * | 9/1995 | Kiri et al. ....................... 717/155 |
| 5,974,549 A * | 10/1999 | Golan .............................. 726/23 |
| 7,284,274 B1 * | 10/2007 | Walls et al. ...................... 726/25 |
| 7,392,541 B2 | 6/2008 | Largman et al. |
| 7,624,449 B1 | 11/2009 | Perriot |
| 7,849,509 B2 * | 12/2010 | Venkatapathy et al. ........ 726/25 |
| 7,975,305 B2 | 7/2011 | Rubin et al. |
| 8,117,531 B1 | 2/2012 | Lueck |

(Continued)

OTHER PUBLICATIONS

United States Patent and Trademark Office, "Non-Final Office Action," issued in connection with U.S. Appl. No. 13/155,179, Mar. 29, 2013, 32 pages.

(Continued)

*Primary Examiner* — Jung Kim
*Assistant Examiner* — Thomas Ho
(74) *Attorney, Agent, or Firm* — Hanley, Flight & Zimmerman, LLC

(57) ABSTRACT

Analyzing computer code using a tree is described. For example, a client device generates a data request for retrieving data from a non-trusted entity via a network. A gateway is communicatively coupled to the client device and to the network. The gateway is configured to receive computer code from the non-trusted entity via the network. The gateway builds a tree representing the computer code. The tree has one or more nodes. A node of the tree represents a statement from the computer code. The gateway analyzes the statement to identify symbol data. The symbol data describes a name of the variable and the value of the variable. The gateway stores the symbol data in a symbol table.

20 Claims, 9 Drawing Sheets

(56) References Cited

U.S. PATENT DOCUMENTS

| | | | |
|---|---|---|---|
| 2002/0095660 A1* | 7/2002 | O'Brien et al. | 717/127 |
| 2003/0023873 A1 | 1/2003 | Ben-Itzhak | |
| 2003/0056199 A1* | 3/2003 | Li et al. | 717/127 |
| 2003/0065926 A1 | 4/2003 | Schultz et al. | |
| 2003/0084063 A1* | 5/2003 | DelMonaco et al. | 707/103 R |
| 2004/0078784 A1* | 4/2004 | Bates et al. | 717/129 |
| 2005/0138413 A1 | 6/2005 | Lippmann et al. | |
| 2005/0289358 A1 | 12/2005 | Haselden et al. | |
| 2006/0161980 A1 | 7/2006 | Huitema et al. | |
| 2006/0190606 A1 | 8/2006 | Kohavi | |
| 2007/0113282 A1 | 5/2007 | Ross | |
| 2007/0143851 A1 | 6/2007 | Nicodemus et al. | |
| 2007/0250930 A1 | 10/2007 | Aziz et al. | |
| 2007/0277163 A1* | 11/2007 | Avresky | 717/140 |
| 2008/0016339 A1 | 1/2008 | Shukla | |
| 2008/0189086 A1 | 8/2008 | Ford et al. | |
| 2008/0216175 A1 | 9/2008 | Pike | |
| 2008/0263659 A1 | 10/2008 | Alme | |
| 2008/0301796 A1* | 12/2008 | Holostov et al. | 726/12 |
| 2009/0019545 A1 | 1/2009 | Ben-Itzhak et al. | |
| 2009/0077091 A1 | 3/2009 | Khen et al. | |
| 2009/0282480 A1 | 11/2009 | Lee et al. | |
| 2009/0328210 A1 | 12/2009 | Khachaturov et al. | |
| 2010/0115620 A1* | 5/2010 | Alme | 726/24 |
| 2011/0179347 A1* | 7/2011 | Proctor et al. | 715/234 |
| 2011/0307954 A1 | 12/2011 | Melnik et al. | |

OTHER PUBLICATIONS

United States Patent and Trademark Office, "Non-Final Office Action," issued in connection with U.S. Appl. No. 13/158,106, Feb. 14, 2013, 21 pages.

Patent Cooperation Treaty, "International Preliminary Report on Patentability," issued in connection with Application No. PCT/US2011/039869, Dec. 27, 2012, 5 pages.

Patent Cooperation Treaty, "International Preliminary Report on Patentability," issued in connection with Application No. PCT/US2011/040040, Dec. 27, 2012, 7 pages.

Patent Cooperation Treaty, "International Preliminary Report on Patentability," issued in connection with Application No. PCT/US2011/039927, Dec. 27, 2012, 6 pages.

AdSafe, Making JavaScript Safe for Advertising, http://www.adsafe.org, retrieved Sep. 20, 2011, 4 pgs.

Code Coverage Meter, http://www.coveragemeter.com/codecoverage.html, retrieved Feb. 13, 2012, 11 pgs.

Erickson, MashupOS: Can You Have Security and Web 2.0?, Dr. Dobb's Bloggers, Apr. 23, 2008, 4 pgs.

FBJS (Facebook JavaScript)—Facebook Developers, http://www.developers.facebook.com/docs/fbjs, retrieved Feb. 13, 2012, 17 pgs.

Google-caja, http://code.google.com/p/google-caja/, retrieved Sep. 20, 2011, 6 pgs.

Grune et al., Modern Compiler Design, First Edition, VU University Amsterdam, Amsterdam, The Netherlands, John Wiley & Sons, Ltd., 2000, ISBN 0471976970, 753 pgs.

Hayhurst et al., A Practical Tutorial on Modified Condition/Decision Coverage, NASA/TM-2001-210876, National Aeronautics and Space Administration, Langley Research Center, Hampton, VA, May 2001, 85 pgs.

Ho et al., Practical Taint-Based Protection using Demand Emulation, EuroSys 2006, pp. 29-41.

Howell et al., MashupOS: Operating System Abstractions for Client Mashups, 7 pgs.

International Search Report, International Application No. PCT/US2011/39869, Oct. 13, 2011, 8 pgs.

International Search Report, International Application No. PCT/US2011/39927, Sep. 29, 2011, 7 pgs.

International Search Report, International Application No. PCT/US2011/40040, Oct. 13, 2011, 16 pgs.

JavaScript the Definitive Guide, Chapter 20 JavaScript Security, 20A The Data-Tainting Security Model, docstore.mik.ua/orelly/web/jscript/ch20_04.html, retrieved Jan. 13, 2012, 5 pgs.

JSCoverage, Code Coverage for JavaScript, http://siliconforks.com/jscoverage/, retrieved Sep. 2, 2011, 2 pgs.

Livshits et al., Spectator: Detection and Containment of JavaScript Worms, 27 pgs.

Microsoft-Research, Gatekeeper, http://research.microsoft.com/en-us/projects/gatekeeper/, retrieved Sep. 20, 2011, 1 pg.

Microsoft-Research, Nozzle & Zozzle: JavaScript Malware Detection, http://research.microsoft.com/en-us/projects/nozzle/, retrieved Sep. 20, 2011, 2 pgs.

Microsoft WebSandbox Technology Preview, http://websandbox.livelabs.com/, retrieved Sep. 20, 2011, 6 pgs.

Nair et al., A Virtual Machine Based Information Flow Control System for Policy Enforcement, Department of Computer Science, Vrije Universiteit, Amsterdam, The Netherlands, Electronic Notes in Theoretical Computer Science 197, 2008, 14 pgs.

JavaScript Security, Chapter 14 JavaScript Security, http://devedge-temp.mozilla.org/library/manuals/2000/javascript/1.3/guide/sec.html#1021266, retrieved Sep. 20, 2011, 19 pgs.

Perlsec—perldoc.perl.org, retrieved Jan. 13, 2012, 11 pgs.

Reis et al., Usenix, BrowserShield: Vulnerability-Driven Filtering of Dynamic HTML, OSDI '06 Paper, http://www.usenix.org/events/osdi06/tech/full_papers/reis/reis_html/index.html, retrieved Sep. 20, 2011, 24 pgs.

W3C, The World Wide Web Security FAQ, CGI (Server) Scripts, www.w3.org/Security/Faq/wwwsf4.html#CGI-Q15, retrieved Jan. 13, 2012, 17 pgs.

Wang et al., The Multi-Principal OS Construction of the Gazelle Web Browser, MSR Technical Report MSR-TR-2009-16, 20 pgs.

"Chianti: A Tool for Change Impact Analysis of Java Programs," Xiaoxia Ren, Fenil Shah, Frank Tip, Barbara Ryder, Ophelia Chesley, OOPSLA '04, Oct. 24-28, 2004, 17 pages.

* cited by examiner

SYSTEM AND METHOD FOR ANALYZING MALICIOUS CODE USING A STATIC ANALYZER

CROSS REFERENCE

This application claims priority from the following U.S. provisional patent application, which is hereby incorporated by reference: Ser. No. 61/353,957, filed on Jun. 11, 2010, and entitled "Method and System for Detecting Malicious Content."

BACKGROUND OF THE INVENTION

1. Field of the Invention

The present invention generally relates to malware detection and in particular to a static analyzer for analyzing malicious computer code.

2. Description of the Background Art

Computer networks and systems have become indispensable tools for modern data communication. Terabits of information are communicated by computer networks throughout the world. Much of this information is, to some degree, confidential and its protection is required. However, security threats have become increasingly able to evade conventional signature or pattern based detection techniques. This problem is enhanced with advent of widespread use of dynamic computer code such as JavaScript in websites. In addition to viruses, additional types of malicious software ("malware"), such as cross-site scripting and Trojans, have become increasingly common methods for impeding the performance of the client device and accessing sensitive information stored on client device.

More information about the malware is necessary to improve network security. It is therefore useful to acquire information describing computer code that is received from non-trusted entities.

SUMMARY OF THE INVENTION

Embodiments of the present invention provide a system and method analyzing computer code using a tree. A client device generates a data request for retrieving data from a non-trusted entity via a network. A gateway is communicatively coupled to the client device and to the network. The gateway is configured to receive computer code from the non-trusted entity via the network. The gateway builds a tree representing the computer code. The tree has one or more nodes. A node of the tree represents a statement from the computer code. The gateway analyzes the statement to identify symbol data. The symbol data describes a name of the variable and a value of the variable. The gateway stores the symbol data in a symbol table. In one embodiment, the gateway analyzes the statement to determine context data describing the scope of the variable. The gateway stores the context data in a context table.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DESCRIPTION OF EMBODIMENTS

Figure 1:
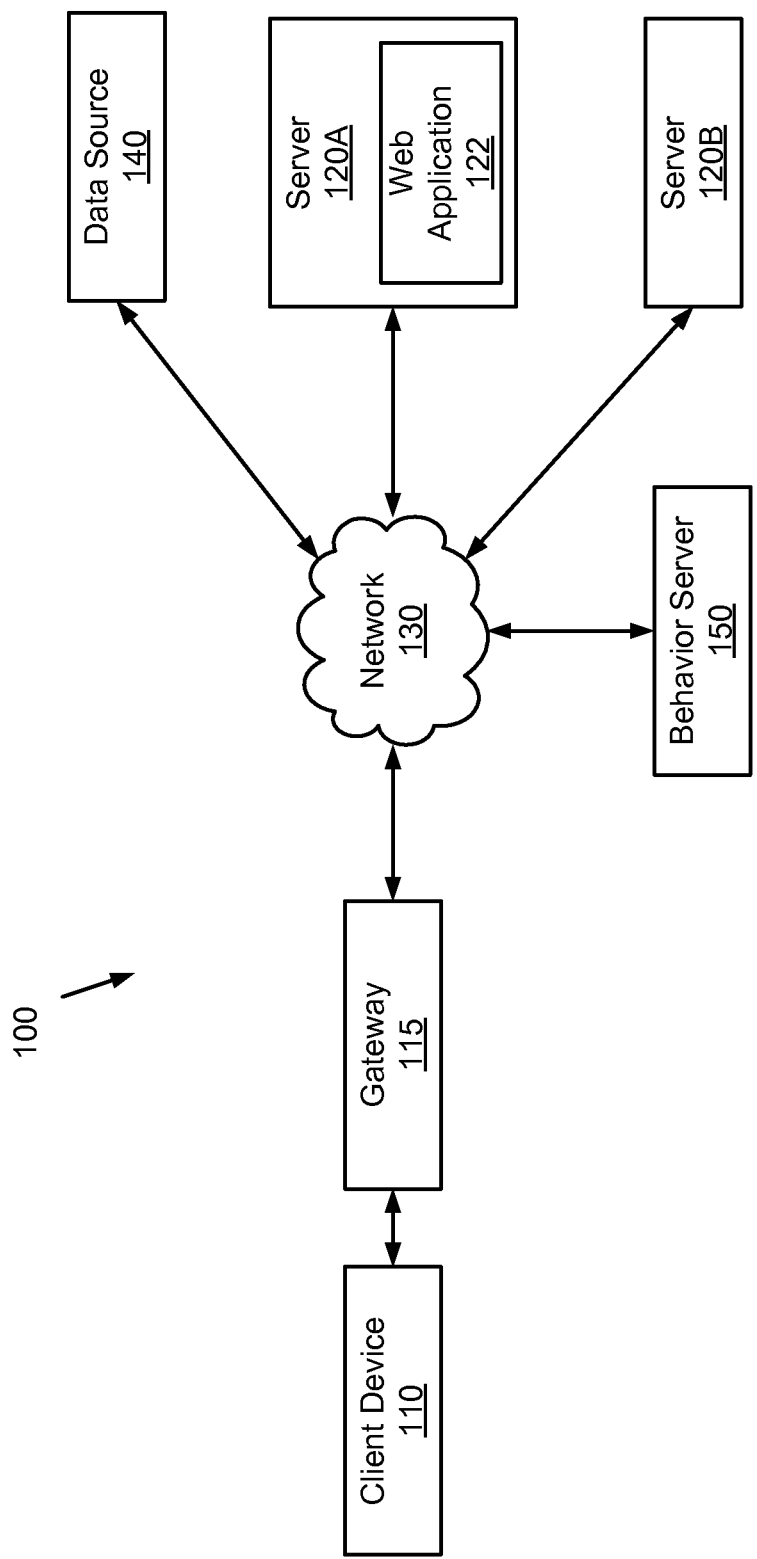
FIG. 1 is a block diagram of a system for using a static analyzer to analyze computer code according to one embodiment.

A method and system for using a static analyzer to analyze computer code in accordance with the present invention is described below. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is described with reference to a particular programming language. It will be appreciated that a variety of programming languages may be used to implement the teachings of the invention as described herein.

System Overview

FIG. 1 is a diagram of a system 100 for using a static analyzer to analyze computer code according to one embodiment. In the embodiment of FIG. 1, the system 100 includes a client device 110, a first server 120A, a second server 120B and a data source 140 exchanging data with each other via a network 130. Additionally, in the embodiment shown by FIG. 1, the client device 110 is coupled to a gateway 115, which is coupled to the network 130. Thy system 100 also includes a behavior server 150. In other embodiments, the system 100 includes additional and/or different components than the ones shown in FIG. 1.

The client device 110 is a computing device having data processing and communication capabilities. For example, a client device 110 comprises a desktop computer, a laptop computer, a netbook computer, a tablet computer, a smartphone or an internet capable television. While the system 100 shown by FIG. 1 includes a single client device 110, in other embodiments, the system 100 includes multiple client devices 110. For example, different types of client devices 110 are included in the system 100, such as a smartphone, a tablet computer and/or a laptop computer.

The client device 110 executes instructions or data using a processor to store, retrieve, modify or otherwise access data. When executing one or more processes, the client device 110 may access data from a remote source, such as a server 120 or another data source 140 via the network 130. To access remote data, the client device 110 transmits a data request to the server 120 or data source 140 via the network 130. The data request identifies the requested data as well as the client device 110 and may include additional information for identifying and retrieving the data.

A gateway 115 is coupled to the client device 110 and to the network 130 and receives one or more data requests from the client device 110. The gateway 115 communicates the data request to a first server 120A, a second server 120B or a data source 140 via the network 130. The gateway 115 receives data from one or more of the first server 120A, the second server 120B and the data source 140 via the network 130. For example, responsive to the data request, the gateway 115 receives data from one or more of the first server 120A, the second server 120B and the data source 140 via the network 130. The gateway 115 is a computing device that couples one or more client devices 110 to a network 130. For example, the gateway 115 is a router, a wireless access point, a network switch or any other suitable type of computing device. While FIG. 1 shows the gateway 115 as a separate component, in some embodiments the gateway 115 is included in the client device 110.

In addition to communicating data requests and data between a client device 110 and the first server 120A, the second server 120B and the data source 140, the gateway 115 also uses a static analyzer to analyze computer code. For example, the gateway 115 receives computer code from one or more of the data source 140, the first server 120A and the second server 120B. In one embodiment, the computer code is any routine and/or script received from the web application 122 and/or the data source 140. The gateway 115 analyzes the computer code, for example, to collect tree data describing the computer code.

Specifically, the gateway 115 parses the computer code to build a tree. For example, the gateway 115 parses the computer code to build an Abstract Syntax Tree ("AST" or "AST tree"). The AST tree is any form of AST tree. Each node of the tree includes one or more statements from the original computer code. In one embodiment, a node of the tree represents one or more statements occurring in the computer code. The gateway 115 stores a symbol table and a context table. The symbol table stores information describing one or more of the variables in the statement. For example, the gateway 115 parses a name and a value for a variable from the statement and stores the name and the value for the variable in the symbol table. The name and the value for the variable are referred to herein as "symbol data." The context table stores information describing the scope the variable described by the symbol data in the symbol table.

In one embodiment, the symbol data describes each variable by the variable name and the value for the variable. The gateway 115 determines whether the variable is a control statement. If the variable is a control statement, the gateway 115 analyzes the variable to determine the scope of the variable. The gateway 115 stores information describing the scope of the variable in a context table. The information describing the scope of the variable is referred to herein as "context data." In one embodiment, the symbol data for a variable is associated with a corresponding entry of context data stored in the context table. This association is stored in one or more of the symbol table and the context table. In another embodiment, the symbol table can have a variable name stored in it more than once, and the scope data stored in the context table (sometimes referred to as context data) can be used to differentiate the commonly named variables in the symbol table.

The gateway 115 analyzes the nodes of the tree to build and update the symbol table and the context table. This is described in further detail with reference to FIGS. 5 and 6A-6D.

The gateway 115 determines whether the one or more statements are simple statements. In one embodiment, a simple statement is a statement consisting of basic algebraic operators or intrinsic language functions. Simple statements are described in more detail below with reference to FIGS. 4, 5 and 6A-6D. Responsive to determining that a statement is a simple statement, the gateway 115 executes the statement. The gateway 115 analyzes the execution of the simple statement and updates the symbol table and the context table with additional information describing the one or more variables of the simple statement and the scope of the one or more variables. For example, the gateway 115 analyzes changes in the values of a variable that occur responsive to executing the statement. These changes to the value are described by value data indicating the new value for the variable. The gateway 115 tracks these changes and updates the symbol table by the value data describing the new value in the symbol table. The gateway 115 also tracks the changes to the statement scope. The gateway 115 updates the context table by storing context data describing the changes to the statement scope in the context table.

In one embodiment, the gateway 115 monitors the executed statement for behavior indicating that the statement is a component of malicious computer code. As used herein, the term "malicious computer code" refers to computer code that is associated with malware or that otherwise seeks to impair performance of the client device 110 and/or gateway 115, or transmit data from the client device 110 and/or gateway 115 without authorization.

The server 120A comprises a web application 122. The web application is code and routines that, when executed by a processor of the server 120A (the processor is not pictured), causes the web application to transmit computer code to the client device 110. In one embodiment, the computer code is any routine and/or script received from the web application 122 and/or the data source 140. For example, the computer code is a script or routine written in JavaScript, Hypertext Transfer Protocol, Cascading Style Sheets, etc. In another embodiment, the computer code is malicious. The computer code is intercepted by the gateway 115. The gateway 115 performs steps described below with reference to FIGS. 5 and 6A-6D to analyze and collect data describing the computer code and/or determine whether the computer code is exhibiting behavior indicating that the computer code is malicious.

The network 130 is a conventional network and may have any number of configurations such as a star configuration, a token ring configuration or another configuration known to those skilled in the art. In various embodiments, the network 130 is a wireless network, a wired network or a combination of a wireless and a wired network. Furthermore, the network 130 may be a local area network (LAN), a wide area network (WAN) (e.g., the Internet) and/or any other interconnected data path across which multiple devices may communicate. In yet another embodiment, the network 130 may be a peer-to-peer network.

The network 130 may also be coupled to, or include, portions of a telecommunications network for communicating data using a variety of different communication protocols. In yet another embodiment, the network 130 includes a Bluetooth communication network and/or a cellular communications network for sending and receiving data (e.g., 3G and/or 4G network). For example, the network 130 transmits and/or receives data using one or more communication protocols such as short messaging service (SMS), multimedia messaging service (MMS), hypertext transfer protocol, direct data connection, WAP, email or another suitable communication protocol.

A server 120 or a data source 140 is a computing device including data processing and communication capabilities. For purposes of illustration, FIG. 1 illustrates a system 100 including a first server 120A and a second server 120B; however, in other embodiments, the system 100 includes any number of servers 120. For example, a server 120 includes a processor, a communication unit and a storage device. However, in other embodiments, a server 120 may include different and/or additional components. A server 120 receives a data request from a client device 110 and transmits data to the client device 110 via the network 130. In one embodiment, a server 120 generates data or modifies data responsive to the data request. Different processes executed by the client device 110 may generate data requests for different servers 120. For example, a first process executed by the client device 110 generates a data request that is communicated to a first server 120A, while a second process executed by the client device 110 generates a data request that is communicated to a second server 120B.

In one embodiment, the system 100 includes a behavior server 150 coupled to the gateway 115 and/or the client device 110 via the network 130. The behavior server 150 is a computing device having data processing and data communication capabilities that includes data describing malicious data requests or data requests associated with malware (e.g., malicious computer code). In one embodiment, the behavior server 150 stores attributes of malicious computer code in a database. The database is communicated from the behavior server 150 to the gateway 115, which subsequently compares attributes of computer code intercepted by the gateway 115 from one or more of the non-trusted devices (e.g., server 120A, 120B and data source 140) with the database to identify malicious computer code. In one embodiment, malicious compute code is computer code that makes data requests that will harm the client device 110 and/or the gateway 115, or attempts unauthorized transmission of data stored on storage device associated with the client device 110 and/or gateway 115 to a non-trusted device. Additionally, the behavior server 150 communicates with the gateway 115 or the client device 110 via the network 130 to update the database, allowing the gateway 115 to use the most current data for identifying malicious computer code. For example, the behavior server 150 transmits an updated database to the gateway 115 or to the client device 110 when additional attributes of malicious computer code are identified.

For example, the behavior server 150 executes malware in one or more virtual machines and captures the data requests generated by the malware. The behavior server 150 then analyzes the data requests to identify one or more attributes of data requests produced by the executing malware. For example, the behavior server 150 identifies a User-Agent, a Computer Name, a Media Access Control Address, a Uniform Resource Indicator and/or a file name from the data requests generated by the malware and analyzes one or more of the attributes generated by different malware to determine characteristics of malicious data requests based on the different types of generated data requests. In one embodiment, the behavior server 150 generates one or more rules identifying attributes of malicious data requests based on analysis of the malicious data requests generated by multiple executing malware. Thus, the rules generated by the behavior server 150 specify attributes indicative of malicious data requests.

For example, the behavior server 150 analyzes the User Agent portion of data requests to identify User Agent portions commonly associated with malicious data requests. The User Agent portion of a data request is a text string that is sent from a client device 110 to a server 120 identifying the process or application generating the data request. In one embodiment, the behavior server 150 includes a blocking listing of User Agent data associated with malicious data requests, such as User Agent data used by different malware. This blocking listing is communicated to the gateway 115 and when the gateway 115 receives a data request including a User Agent portion matching an entry in the blocking listing, the data request is blocked. Alternatively, the behavior server 150 includes an authorized listing including User Agent data associated with legitimate processes. In one embodiment, the authorized listing is communicated to a gateway 115 to allow the gateway 115 to block a data request including a User Agent portion not included in the authorized listing. Alternatively, the behavior server 150 includes both a blocking listing and an authorized listing and communicates both the blocking listing and the authorized listing to a gateway 115. Additional examples of rules generated by the behavior server 150 and used by the gateway 115 to identify malicious data requests are further described below in conjunction with FIGS. 5 and 6A-6D.

Client Device 110

Figure 2:
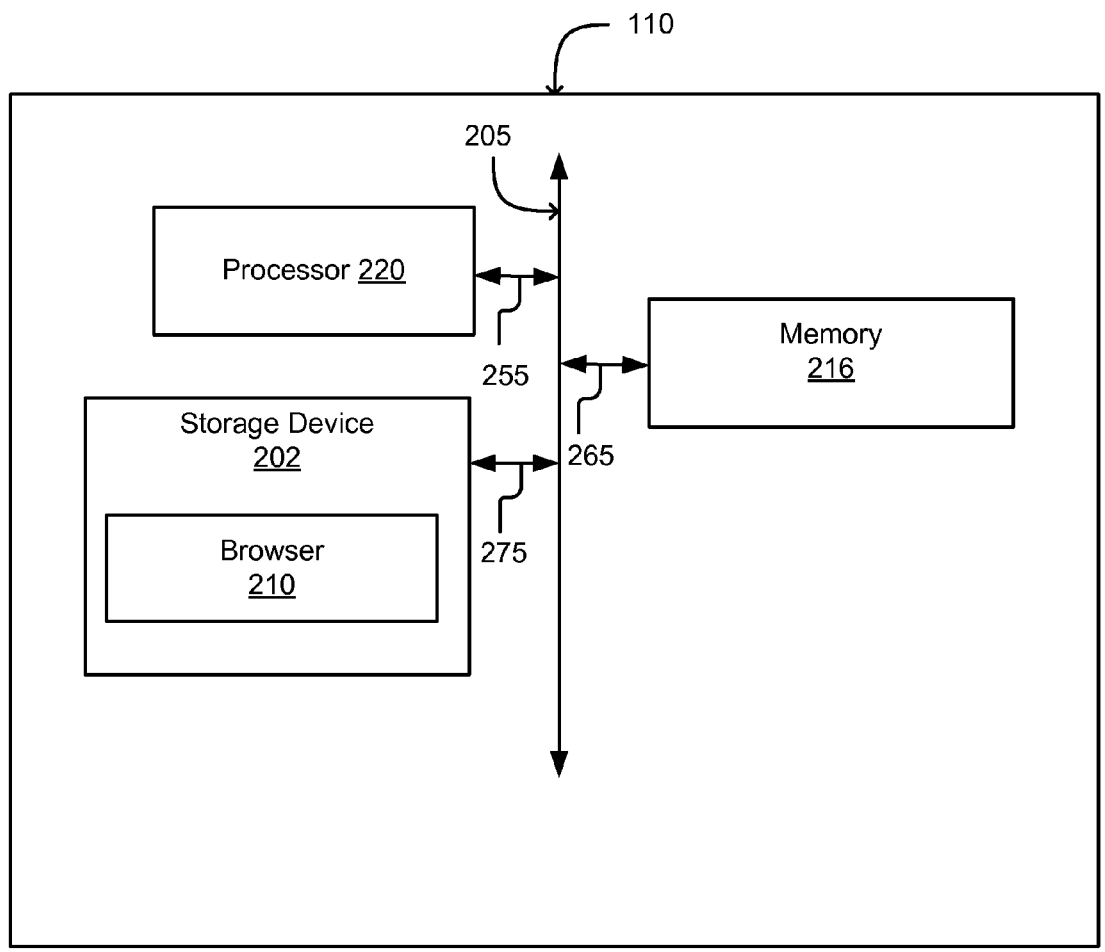
FIG. 2 is a block diagram of a client device according to one embodiment.

FIG. 2 is a block diagram of a client device 110. The client device 110 comprises a processor 220, a memory 216, a storage device 202 (sometimes referred to herein as "storage 202") and a browser 210 stored on the storage device 202.

The processor 220, memory 216, storage device 202 and browser 210 are communicatively coupled to one another via a bus 205. The processor 220 is communicatively coupled to the bus 205 via signal line 255. The memory 216 is communicatively coupled to the bus 205 via signal line 265. The storage device 202 is communicatively coupled to the bus 205 via signal line 275. The browser 210 communicates with the other elements of the client device 110 via the signal line 275.

The processor 220 comprises an arithmetic logic unit, a microprocessor, a general purpose controller or some other processor array to perform computations and provide electronic display signals to a display device. The processor 220 is coupled to the bus 205 for communication with the other components. Processor 220 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 216 stores instructions and/or data that may be executed by processor 220. The memory 216 is coupled to the bus 205 for communication with the other components. The instructions and/or data may comprise code for performing any and/or all of the techniques described herein. The memory 216 may be a dynamic random access memory (DRAM) device, a static random access memory (SRAM) device, flash memory or some other memory device known in the art. In one embodiment, the memory 216 also includes a non-volatile memory or similar permanent storage device and media such as a hard disk drive, a floppy disk drive, a CD-ROM device, a DVD-ROM device, a DVD-RAM device, a DVD-RW device, a flash memory device, or some other mass storage device known in the art for storing information on a more permanent basis.

The storage device 202 is a non-transitory computer-readable memory configured to store computer code. For example, the storage device 202 is a non-volatile storage medium such as a hard drive, flash memory, etc. The storage device 202 stores the browser 210. The processor 220 accesses and executes the browser 210.

The browser 210 is a web browser stored on the on the storage device 202 and configured for two-way communication with the gateway 115. For example, the browser 210 is a software application such as Mozilla FireFox, Windows Internet Explorer, Google Chrome, Apple Safari, Opera, etc. In one embodiment, the browser 210 communicates with the network 130 via the gateway 115.

Gateway 115

Figure 3:
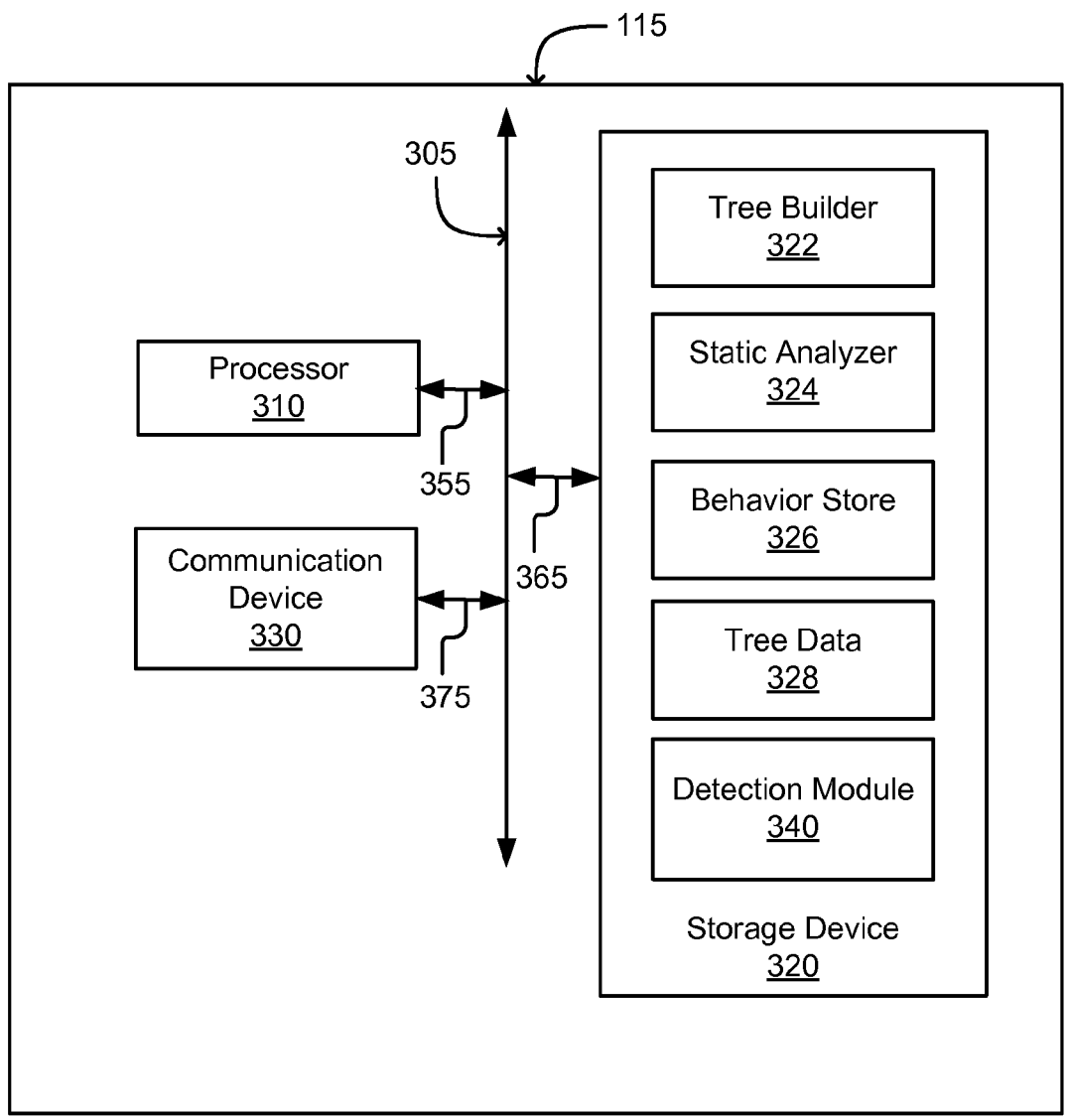
FIG. 3 is a block diagram of a gateway according to one embodiment.

FIG. 3 is a block diagram of one embodiment of a gateway 115. In the embodiment shown by FIG. 3, the gateway 115 includes a processor 310, a storage device 320, a communication device 330 and a detection module 340 communicatively coupled to each other via a bus 305. However, in other embodiments, the gateway 115 includes different and/or additional components than the ones shown by FIG. 3. The processor 310 is communicatively coupled to the bus 305 via signal line 355. The storage device 320 is communicatively coupled to the bus 305 via signal line 365. The communication device 330 is communicatively coupled to the bus 305 via signal line 375.

The processor 310 is an arithmetic logic unit, a microprocessor, a general purpose controller or some other processor array to perform computations or other data processing that is coupled to the bus 305 for communication with the other components of the gateway 115. The processor 310 provides similar functionality as the processor 220 described above with reference to FIG. 2, so that description will not be repeated here.

The storage device 320 is a non-transitory computer-readable memory that stores instructions and/or data that may be executed by processor 310. The stored instructions and/or data may be code for performing any and/or all of the functionality described herein when executed by the processor 310. For example, the storage device 320 includes instructions that, when executed by the processor 310, cause the processor 310 to execute the steps further described below in conjunction with FIGS. 5 and 6A-6D. In one embodiment, the storage device 320 is a non-volatile memory device or similar persistent storage device and media. For example, the storage device 320 may be a hard disk drive, a floppy disk drive, a CD-ROM device, a DVD-ROM device, a DVD-RAM device, a DVD-RW device, a flash memory device or another mass storage device known in the art. In one embodiment, the storage device 320 comprises a dynamic random access memory (DRAM) device, a static random access memory (SRAM) device, flash memory or some other memory device known in the art. In another embodiment, the storage device 320 comprises a combination of persistent memory and non-persistent memory. The storage device 320 is coupled to the bus 305 to communicate with other components of the gateway 115.

In one embodiment, the storage device 320 stores a tree builder 322, a static analyzer 324, a behavior store 326 and tree data 328. In another embodiment, the tree builder 322 is included in the static analyzer 324 so that the tree builder 322 is an element of the static analyzer 324. For example, the tree builder 322 is a parser and the static analyzer 324 is a specially configured compiler that includes the tree builder 322 as a parser element of the compiler. In another embodiment, the tree builder 322 and the static analyzer 324 are each elements of a specially configured compiler that semi-analyzes and semi-executes computer code to determine information included in the tree data 328.

The tree builder 322 is a parser that, when executed by the processor 310, pareses the computer code received from the web application 122 and/or the data source 140 and builds a tree based at least in part on the computer code. In one embodiment, the tree builder 322 builds an AST tree. In other embodiments, the tree builder 322 builds another type of tree-based data structure. The tree builder 322 stores the tree on a non-transitory memory such as the storage device 320. For example, the tree is stored in the tree data 328.

In one embodiment, each node of the tree includes one or more statements from the original computer code. In another embodiment, a node of the tree corresponds to a construct occurring in the computer code.

In one embodiment, the tree built by the tree builder 322 is a binary representation of the computer code. A human user or processor-executed computer program (e.g., a compiler) can directly map the tree to the computer code. A human user or processor-executed computer program can also map the computer code back to the tree built by the tree builder 322. For example, the tree can be mapped to the computer code based at least in part on the binary representation present in the tree. In one embodiment, the tree builder 322 does not build the tree using machine code. Instead, the tree builder 322 builds the tree using any normalized representation of the computer code that is executable by the processor 310 and/or understandable by the static analyzer 324.

In one embodiment, the tree builder 322 embeds one or more probes in the tree. The probe is a function that is communicatively coupled to call the static analyzer 324 and provide information to the static analyzer 324, the client device 110 or some other trusted device describing the progress of analyzing the computer code or a subset of the computer code. For example, the probe is communicatively coupled to the static analyzer 324 to provide the static analyzer 324 with information describing the progress of the static analyzer 324 in analyzing the computer code. The probe is described in greater detail with reference to FIGS. 6A-6D.

In one embodiment, the tree builder 322 is a compiler that parses the computer code received from the web application 122 and/or the data source 140 and builds a tree based at least in part on the computer code.

In another embodiment, the tree builder 322 is a combination of a lexical analyzer and a parser that, when executed by the processor 310, builds a tree representing the computer code.

The static analyzer 324 is code and routines that, when executed by the processor 310, analyzes the tree built by the tree builder 322. For example, the static analyzer 324 is a specially configured compiler that, when executed by the processor 310, analyzes the tree to build and update the symbol table and the context table. The static analyzer 324 is configured to walk one or more nodes of the tree and analyze the one or more nodes. In one embodiment, each node of the tree has one or more statements parsed from the computer code by the tree builder 322 and the static analyzer 324 analyzes these statements. The static analyzer 324 builds and/or updates the symbol table and the context table. The symbol table and the context table are described above with reference to FIG. 1, so that description will not be repeated here. The static analyzer 324 determines if the one or more statements are simple. If the statements are simple the static analyzer 324 executes them and further updates the symbol table and/or the context table (e.g., with updated value data and/or context data). The static analyzer 324 is described in more detail with reference to FIGS. 4, 5 and 6A-6D.

The tree data 328 is data including the symbol table and the context table. The tree data is described in more detail below with reference to FIG. 4.

In one embodiment, the storage device 320 includes a behavior store 326 and a detection module 340. The behavior store 326 includes one or more rules identifying attributes of malicious data requests. For example, the behavior store 326 includes a rule identifying data requests including a Media Access Control (MAC) as malicious, as most known processes do not include a MAC address in a data request. As another example, the behavior store 326 includes a listing of suspicious uniform resource indicators (URIs) for identifying malicious data requests based on a URI included in the data request. As yet another example, the behavior store 326 includes a listing of one or more file names associated with malware, so that data requests including a reference to a listed file name are identified as malicious.

In one embodiment, the behavior store 326 also includes rules identifying attributes or properties of malicious data received from a server 120 or data source 140 in response to a data request. For example, the behavior store 326 associates types of responses from a server 120 or data source 140 with malicious data requests to aid in identification of malicious data requests. In one embodiment, if the server 120 or data source 140 returns less data than an amount of data associated with benign data requests, the behavior store 326 indicates that the data request prompting data transmission is malicious. Similarly, the behavior store 326 associates a data request prompting receipt of a fake error message from a server 120 as a malicious data request. Classifying data requests based on attributes of the received data as well as attributes of the corresponding data request allows the gateway 115 to more accurately identify malicious data requests.

The detection module 340 extracts attributes from a received data request and/or from received data and compares the extracted attributes to the contents of the behavior store 326. In one embodiment, the detection module 340 parses a data request into different attributes and compares at least a subset of the attributes to rules stored by the behavior store 326. In another embodiment, the detection module 340 extracts a subset of attributes of a data request and/or of received data and determines whether the subset of attributes are associated with malicious data requests based on the one or more rules stored in the behavior store 326. In yet another embodiment, the detection module 340 also extracts a subset of the data received by the gateway 115 responsive to a data request and compares the extracted subset of the received data to the content of the behavior store 326 to further determine whether the data request is malicious. The functionality of the behavior store 326 and the detection module 340 is further described below in conjunction with FIGS. 5 and 6A-6D.

The communication device 330 receives data requests from a client device 110 and transmits the data request to a server 120 or a data source 140 via the network 130. The communication device 330 also receives data from the server 120 or from the data source 140 via the network 130 and communicates the data to the client device 110. In one embodiment, the communication device 330 includes a port for direct physical connection to the network or to another communication channel. For example, the communication device 330 includes a USB, SD, CAT-5 or similar port for wired communication with the network. In another embodiment, the communication device 330 includes a wireless transceiver for exchanging data with the network, or with another communication channel, using one or more wireless communication methods, such as IEEE 802.11, IEEE 802.16, BLUETOOTH® or another suitable wireless communication method.

In yet another embodiment, the communication device 330 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In still another embodiment, the communication device 330 includes a wired port and a wireless transceiver. The communication device 330 also provides other conventional connections to the network for distribution of files and/or media objects using standard network protocols such as TCP/IP, HTTP, HTTPS and SMTP as will be understood to those skilled in the art.

Static Analyzer 324

Figure 4:
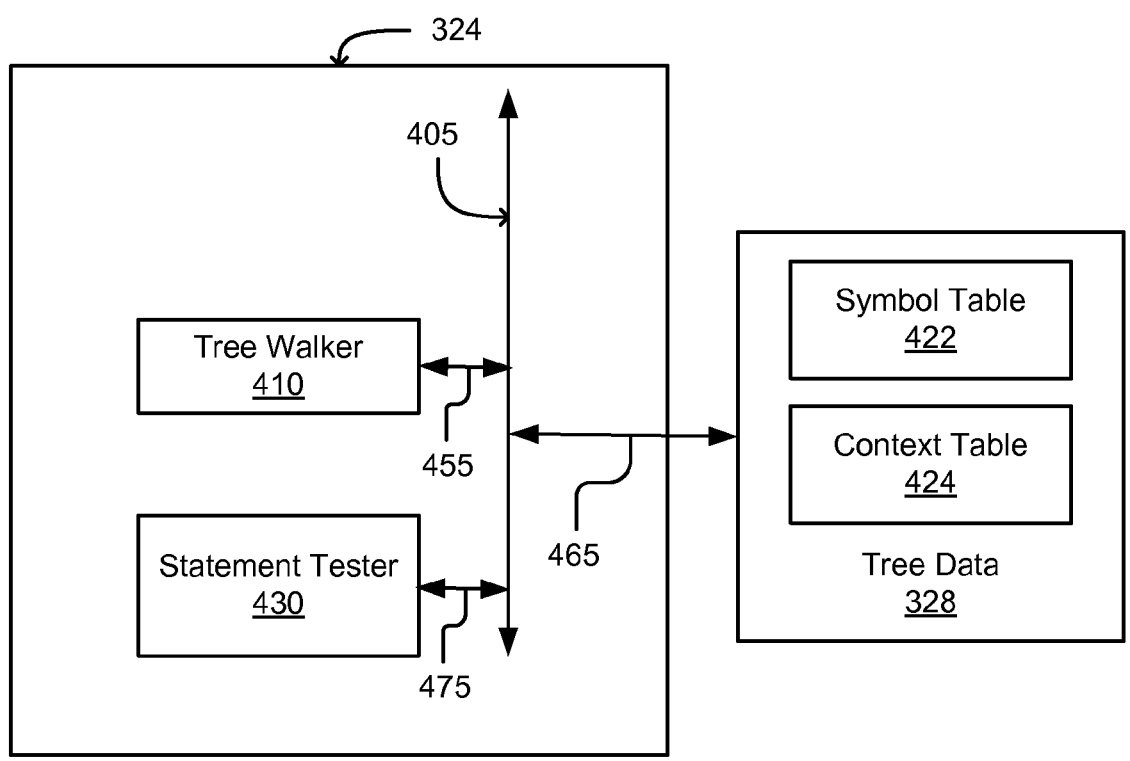
FIG. 4 is a block diagram of a static analyzer according to one embodiment.

FIG. 4 is a block diagram of one embodiment of a static analyzer 324. The static analyzer 324 comprises a tree walker 410 and a statement tester 430. The tree walker 410 and the statement tester 430 are communicatively coupled to one another via a bus 405. The bus 405 is also communicatively coupled to the tree data 328. The tree walker 410 and the statement tester 430 store and access data in the tree data via the bus 405. The tree walker 410 is communicatively coupled to the bus 405 via signal line 455. The statement tester 430 is communicatively coupled to the bus 405 via signal line 475. The tree data 328 is communicatively coupled to the bus 405 via signal line 465.

The tree walker 410 is code and routines that, when executed by the processor 310, walks and analyzes one or more nodes of the tree built by the tree builder 322. For example, the tree walker 410 is code and routines configured to walk the tree built by the tree builder 322 using one or more of a tree grammar, a manual tree walker and an abstract syntax tree walker. In one embodiment, the tree walker 410 includes the functionality of a parser. In another embodiment, the tree walker 410 includes the functionality of a compiler that includes a parser.

In one embodiment, each node of the tree has a statement parsed from the computer code by the tree builder 322. For each node walked, the tree walker 410 parses the statement to identity one or more of the variables in the statement. The tree walker 410 determines whether the identified variable is already stored in the symbol table 422. The tree walker 410 stores the variable and the value for the variable in the symbol table 422 responsive to determining that the variable is not already stored in the symbol table 422. The tree walker 410 updates the value for the variable in the symbol table 422 responsive to determining that the variable is already stored in the symbol table 422.

Next the tree walker 410 determines whether the statement is a control structure. If the statement is a control structure, the tree walker 410 determines the scope of the control structure. Responsive to determining that the statement is a control structure, the tree walker 410 further updates the context table 424 with context data describing the scope of the control structure. If the statement is not a control structure, the tree walker 410 does not update the context table 424. Instead, the tree walker 410 determines whether or not a probe function is included in the statement. The tree walker 410 calls the probe responsive to determining that a probe function is included in the statement.

The tree walker 410 determines whether the statement is completed. A statement is completed if the scope of the statement has been met (e.g., if the life of statement scope is expired). If the statement is completed, the tree walker 410 resets the statement scope. If the statement is not completed (i.e., the scope of the statement has not been met), the tree walker 410 updates the context table 424 with scope data describing the current scope of the statement and the statement's sub-statements (if any).

The tree walker 410 determines if a probe function is installed at the node. If a probe is installed, the tree walker 410 calls the probe.

The tree walker 410 analyzes the statement to determine if it is a simple statement. In one embodiment, a simple statement is a statement that only includes one or more basic language operators (e.g., plus, minus, etc.) applied to one or more variables. In one embodiment, a simple statement is a statement that only includes one or more function codes provided by the language in which the computer code is written. For example, the computer code is written in JavaScript and the statement includes one or more JavaScript functions. In one embodiment, if a statement includes any custom functions provided by a human user, then the statement is not simple. For example, if a statement includes one or more user-defined functions, then the statement is not simple since a simple statement is a statement that does not include any user-defined functions. If the statement is a simple statement, the tree walker 410 communicates with the statement tester 430 to indicate that the statement should the tested. After testing the statement is completed, the tree walker 410 updates the symbol table 422 and the context table 424 to include information describing the observed variables and the associated scope of these variables. For example, the tree walker 410 updates the symbol table 422 and the context table 424 as described below for FIGS. 6C and 6D.

The statement tester 430 is code and routines that, when executed by the processor 310, executes the statement. The statement tester 430 communicates with the tree walker 410 to signal to the tree walker 410 to update the symbol table 422 and the context table 424 responsive to executing the statement. In one embodiment, the statement tester 430 communicates to the detection module 340 to monitor for suspicious behavior by the statement responsive to executing the statement.

In one embodiment, upon execution by the processor 310, tree builder 322, tree walker 410, statement tester 430 and the detection module 340 provide the functionality described below with reference to FIGS. 5 and 6A-6D.

The symbol table 422 and the context table 424 are stored on the storage device 320. The symbol table 422 and the context table 424 are described above, so that description will not be repeated here.

Methods

Figure 5:
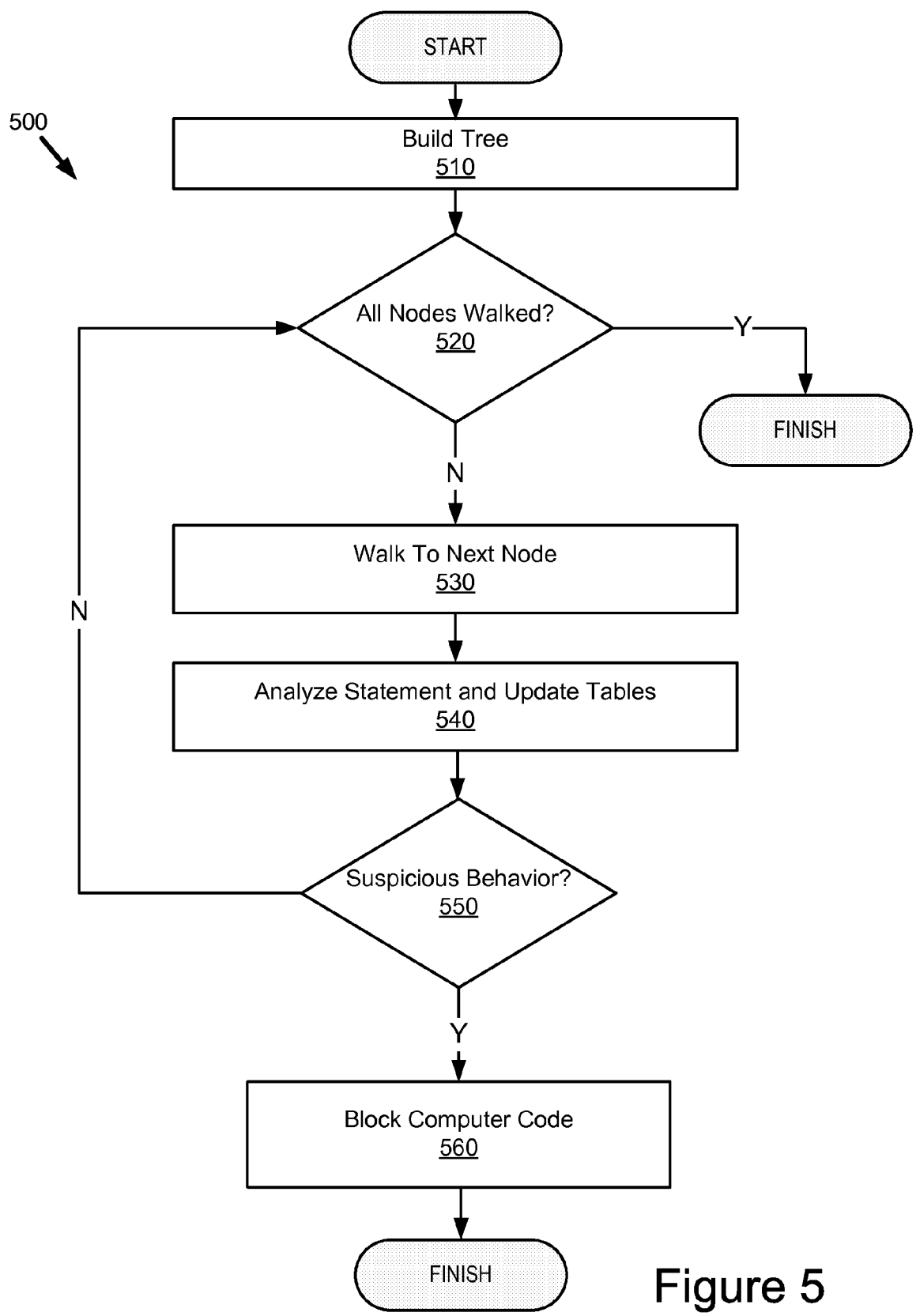
FIG. 5 is a flow chart of a method for using a static analyzer to analyze computer code according to one embodiment.
Figure 6A:
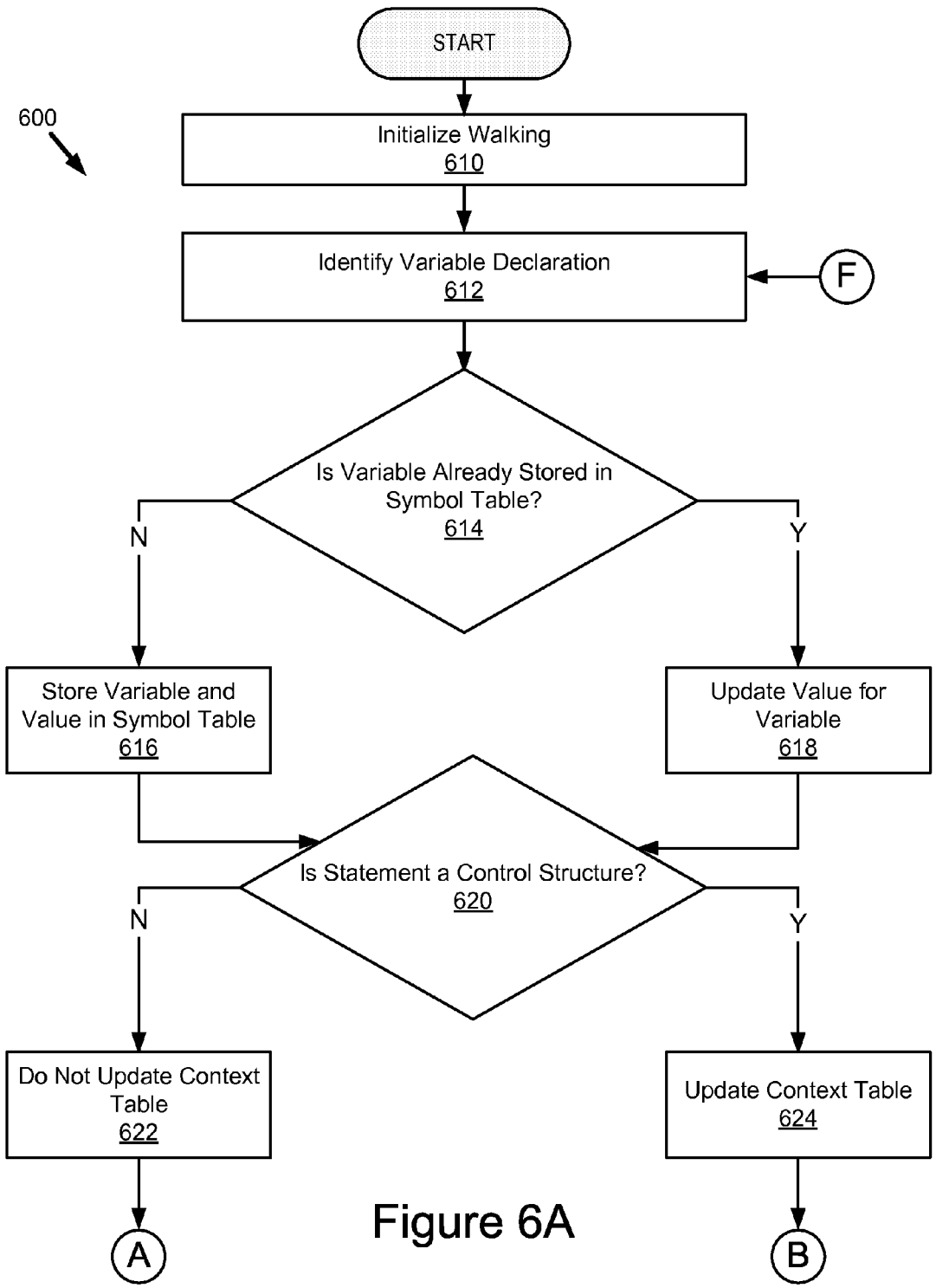
FIGS. 6A, 6B, 6C and 6D are a flow chart of a method for using a static analyzer to analyze computer code according to another embodiment.
Figure 6B:
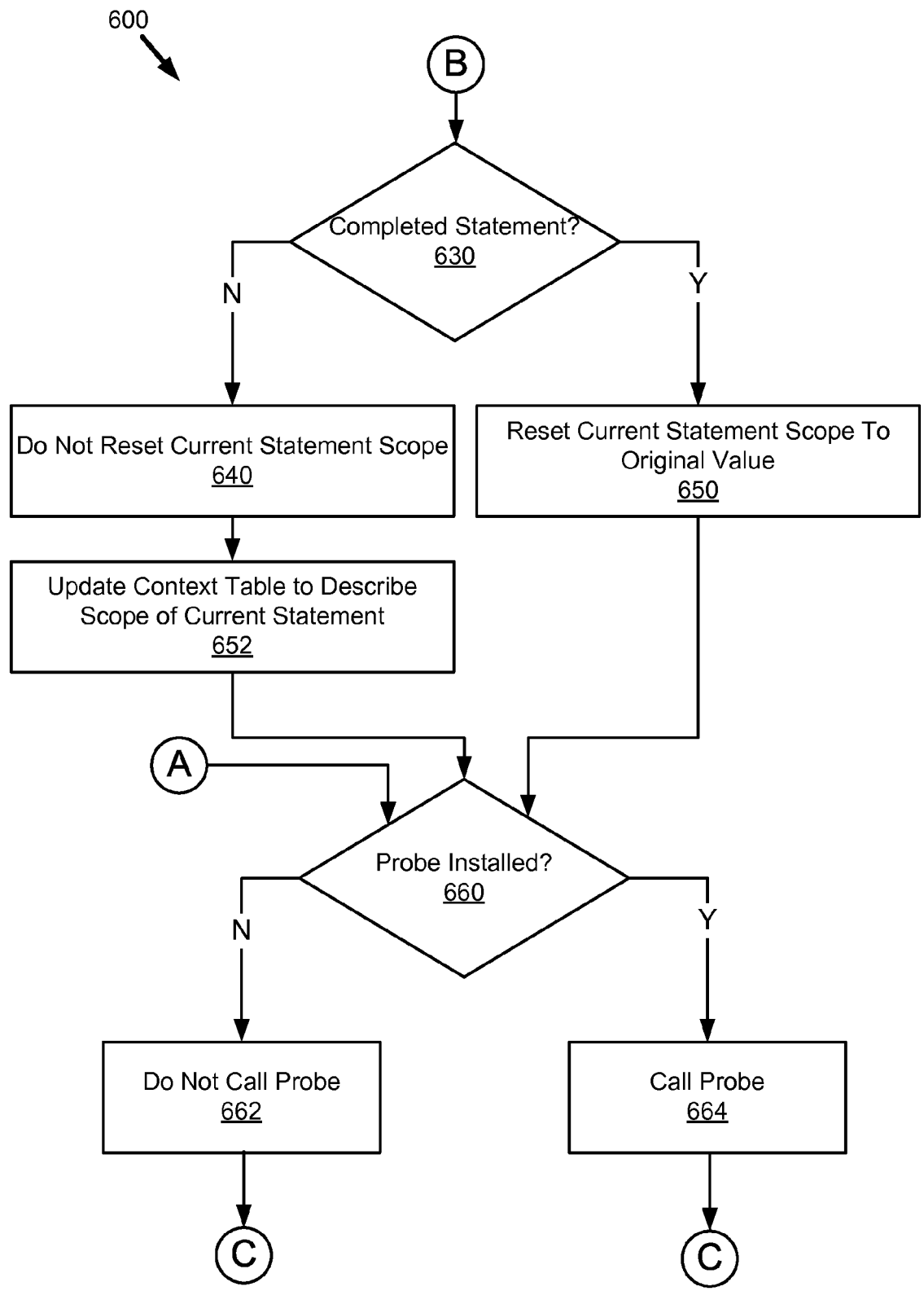
Figure 6C:
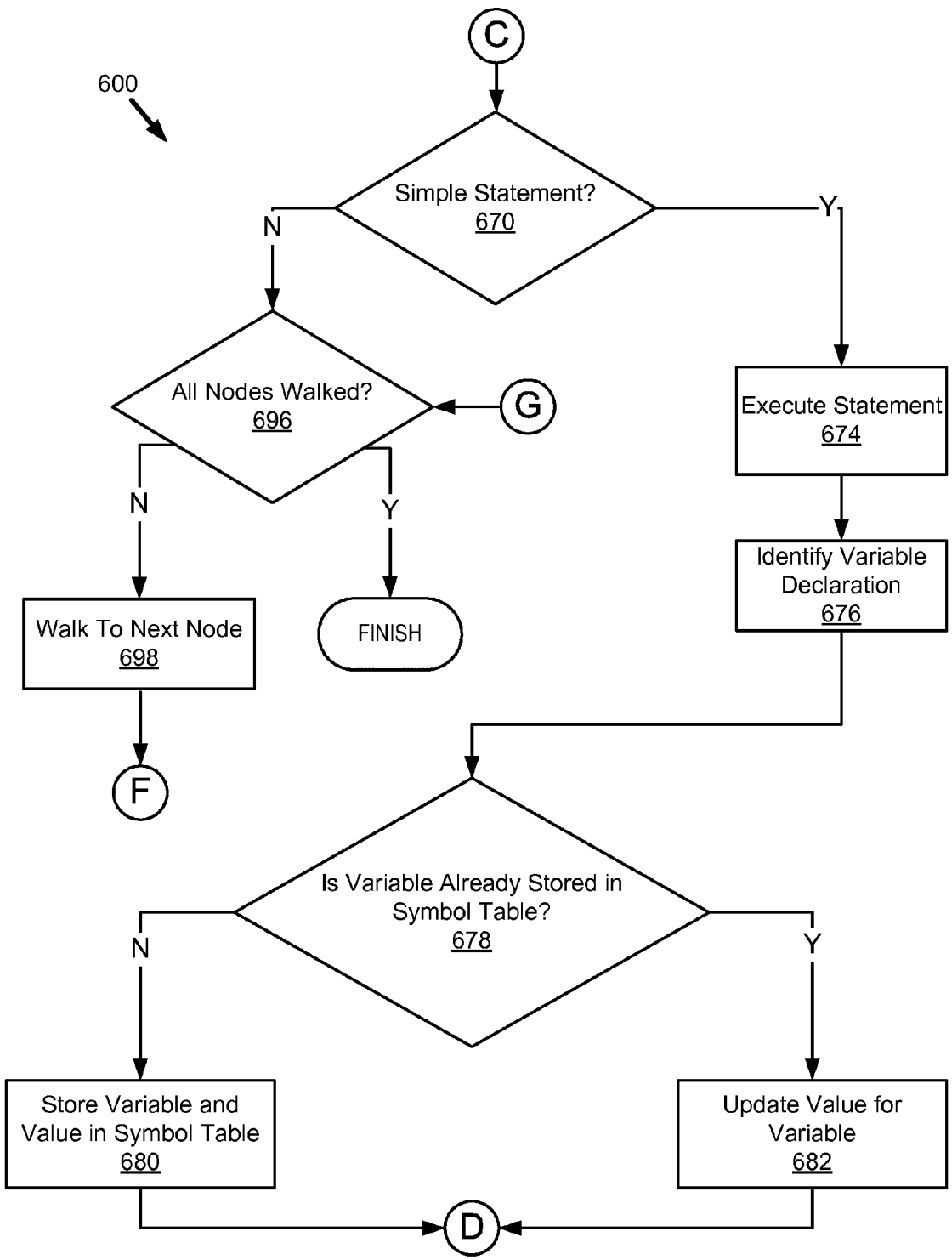
Figure 6D:
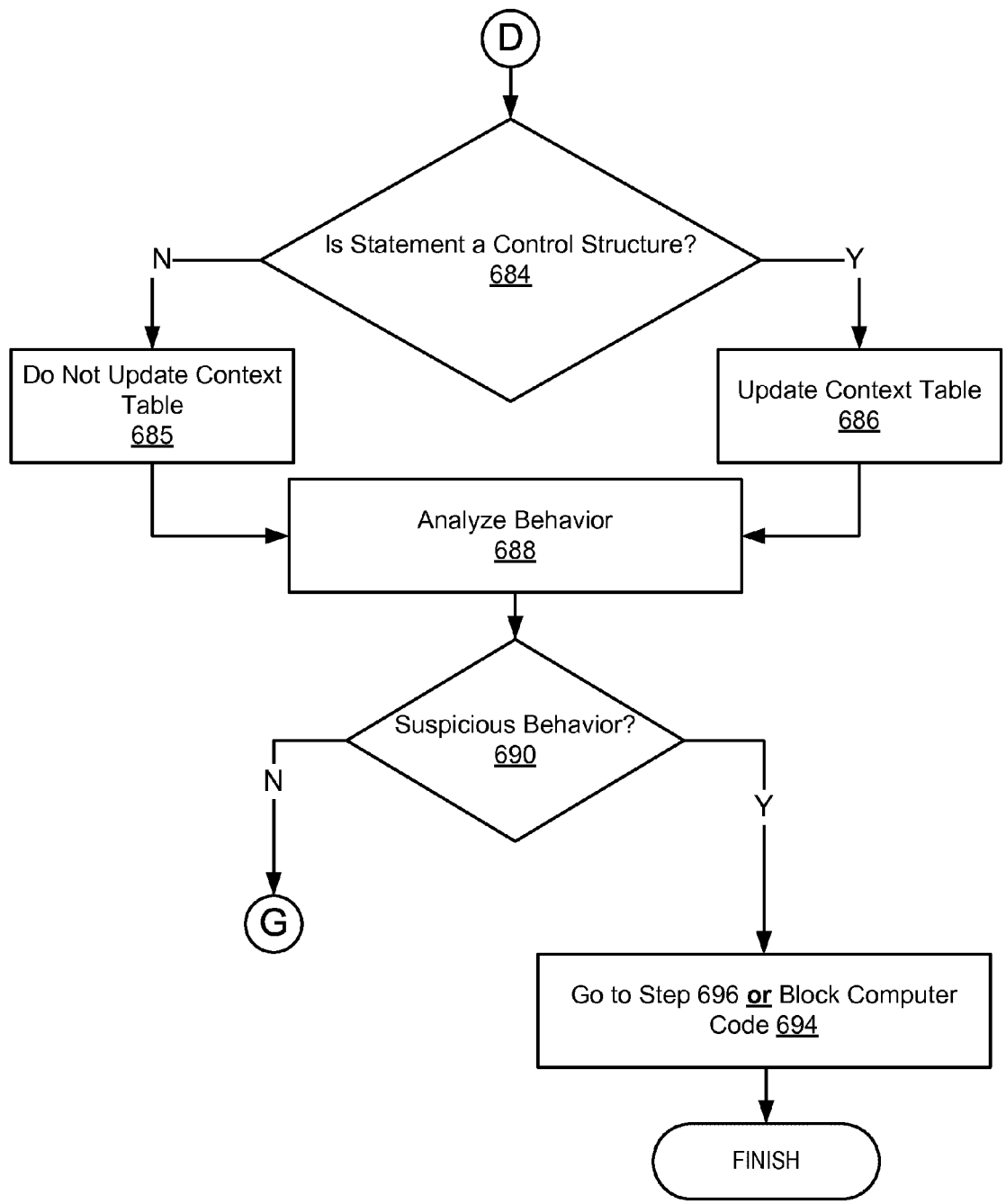

FIG. 5 is a flow chart of a method 500 for using a static analyzer 324 to analyze computer code. The client device 110 makes a request to the web application 122. The web application 122 transmits computer code to the client device 110. For example, the web application 122 transmits a dynamic script (e.g., JavaScript, Hypertext Transfer Protocol, etc) to the client device 110. The gateway 115 intercepts the computer code. The tree builder 322 builds a tree 510 representing the computer code. The tree builder 322 communicates with the static analyzer 324 to begin walking the tree. In one embodiment, each node of the tree includes one or more statements parsed by the tree builder 322 from the computer code. The static analyzer 324 determines 520 whether all the nodes of the tree are walked. If all the nodes of the tree are walked, the static analyzer 324 ends the method 500. If all of the nodes of the tree are not walked, the method 500 moves to step 530 and the static analyzer 324 walks to the next un-walked node. The static analyzer 324 analyzes 540 the node and updates the symbol table 422 and/or the context table 424. The static analyzer 324 executes a statement and communicates with the detection module 340 to determine whether the executed statement exhibits suspicious behavior. The detection module 340 determines 550 whether the executed statement exhibited suspicious behavior. If the detection module 340 determines 550 that the executed statement did not exhibit suspicious behavior, the method 500 returns to step 520. If the detection module 340 determines 550 that the executed statement did exhibit suspicious behavior, the method 500 moves to step 560 and the gateway 115 blocks the computer code.

FIG. 6 is a flow chart of a method 600 for using a static analyzer 324 to analyze computer code. The client device 110 makes a request to the web application 122. The web application 122 transmits computer code to the client device 110. For example, the web application 122 transmits a dynamic script (e.g., JavaScript, Hypertext Transfer Protocol, etc) to the client device 110. The gateway 115 intercepts the computer code. The tree builder 322 builds a tree representing the computer code. The tree builder 322 communicates with the static analyzer 324 to begin walking the tree. The tree walker 410 initiates 610 walking a tree built by the tree builder 322. For each node walked, the tree walker 410 parses the statement to identify 612 one or more of the variables in the statement. The tree walker 410 determines 614 whether the identified variable is already stored in the symbol table 422. The tree walker 410 stores 616 the variable name and the value for the variable in the symbol table 422 responsive to determining that the variable is not already stored in the symbol table 422. The tree walker 410 updates 618 the value for the variable in the symbol table 422 responsive to determining that the variable is already stored in the symbol table 422.

At step 620, the tree walker 410 determines whether the statement is a control structure. If the statement is not a control structure, the method 600 proceeds to step 622 and the tree walker 410 does not update the context table 424. Instead, the method 600 advances to step 660 (step 660 is described below). If the statement is a control structure, the method 600 proceeds to step 624 and the tree walker 410 determines the scope of the control structure and updates the context table 424 with context data describing the scope of the control structure.

At step 630, the tree walker 410 determines whether the statement is completed. A statement is completed if the scope of the statement has been met (e.g., if the life of statement scope is expired). If the statement is completed, the method 600 proceeds to step 650 and the tree walker 410 resets the statement scope to the original value based at least in part on the scope of the variable to which the statement belongs as indicated by the context table 424. The method 600 advances to step 660 (step 660 is described below).

If the statement is not completed (i.e., the scope of the statement has not been met), the method 600 proceeds to step 640 and the tree walker 410 does not reset the current statement scope. Instead, the method 600 proceeds to step 652 and the tree walker 410 updates the context table 424 with scope data describing the current scope of the statement and the statement's sub-statements (if any).

The method proceeds to step 660. At step 660, the tree walker 410 determines if a probe function ("a probe") is installed at the node. If a probe is not installed, the method 600 proceeds to step 662 and the tree walker 410 does not call a probe. If a probe is installed, the method 600 advances to step 664 and the tree walker 410 calls the probe.

At step 670, the tree walker 410 analyzes the statement to determine if it is a simple statement. If the tree walker 410 determines that statement is not a simple statement, the method moves to step 696. At step 696, the tree walker 410 determines whether all the nodes of the tree are walked. If all the nodes of the tree are walked, the method ends. If all of the nodes of the tree are not walked, the method 600 moves to step 698 and the tree walker 410 walks to the next un-walked node. The method then returns to step 612. If the statement is a simple statement, the method 600 moves to step 674 and the tree walker 410 communicates with the statement tester 430 to indicate that the statement should be tested by the statement tester 430. The statement tester 430 communicates with the tree walker 410 to indicate that the statement is about to be executed.

The statement tester 430 executes 674 the statement. In one embodiment, executing the statement reveals the actual variable names, values and scopes. The tree walker 410 identifies 676 one or more variable names. At step 678, the tree walker 410 determines whether the identified variable is already stored in the symbol table 422. The tree walker 410 stores 680 the variable name and the value for the variable in the symbol table 422 responsive to determining that the variable is not already stored in the symbol table 422. The tree walker 410 updates 682 the value for the variable in the symbol table 422 responsive to determining that the variable is already stored in the symbol table 422.

At step 684, the tree walker 410 determines whether the statement is a control structure. If the statement is not a control structure, the method 600 proceeds to step 685 and the tree walker 410 does not update the context table 424. If the statement is a control structure, the method 600 proceeds to step 686 and the tree walker 410 determines the scope of the control structure and updates the context table 424 with context data describing the scope of the control structure.

Contemporaneous to execution of the statement (e.g., step 674), the static analyzer 324 communicates with the detection module 340 to indicate to the detection module 340 that the statement will be executed. At step 688, the detection module 340 analyzes the behavior of the executed statement using the data stored in the behavior store 326. The detection module 340 determines 690 whether the executed statement exhibited suspicious behavior. If no suspicious behavior is detected by the detection module 340, the method returns to step 696. If suspicious behavior is detected by the behavior module 340, the method 600 goes to step 694. At step 694, the method 600 either returns to step 696 or blocks the computer code (e.g., based on input received from a human administrator of the gateway 115).

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method comprising:
   parsing, via a processor, computer code received from a non-trusted entity via a network, the computer code received by a gateway when sent by the non-trusted entity to a client device in response to a request from the client device;
   transforming, via the processor, the parsed computer code into an abstract syntax tree, the abstract syntax tree containing a first node having a statement from the parsed computer code;
   analyzing, via the processor, the statement in the first node to determine if the statement contains a user-defined function;
   in response to determining that the statement in the first node does not contain the user-defined function, executing the statement; and
   determining the computer code is malicious by comparing a result of the execution of the statement in the first node to a set of rules denoting malicious behavior.

2. The computer-implemented method according to claim 1, wherein analyzing the statement in the first node to determine if the statement contains the user-defined function further comprises:
   identifying a variable contained in the first node;
   identifying symbol data describing the variable, the symbol data including a name of the variable and a value associated with the variable; and
   storing the symbol data in a symbol table.

3. The computer-implemented method according to claim 2, further comprising:
   determining context data associated with the statement, the context data describing a scope of the statement;
   caching the context data in a context table; and
   associating the context data in the context table with corresponding symbol data in the symbol table.

4. The computer-implemented method according to claim 1, further comprising:
   determining if the first node includes a probe function; and
   in response to determining that the first node does not include the probe function, inserting the probe function in the first node.

5. The computer-implemented method according to claim 1, further comprising:
   determining if the statement in the first node is a simple statement, the simple statement being a statement having a basic language operator applied to a variable and a function code associated with a standard library of a programming language of the computer code.

6. The computer-implemented method according to claim 2, wherein executing the statement further comprises:
   detecting induced changes to the symbol data after executing the statement; and
   updating the symbol table to reflect the induced changes to the symbol data.

7. The computer-implemented method according to claim 1, further comprising, in response to determining that the computer code is malicious, blocking the computer code.

8. A tangible computer readable storage device or storage disc comprising instructions that, when executed, cause a gateway device to at least:
   parse computer code received from a non-trusted entity via a network, the computer code received by the gateway when sent by the non-trusted entity to a client device in response to a request from the client device;
   generate an abstract syntax tree from the parsed computer code, the abstract syntax tree containing a first node having a statement from the parsed computer code;
   determine if the statement in the first node contains a user-defined function;
   in response to determining that the statement in the first node does not contain the user-defined function, executing the statement; and
   determine the computer code is malicious by comparing a result of the execution of the statement in the first node to a set of rules denoting malicious behavior.

9. The tangible computer readable storage device or storage disc of claim 8, wherein the instructions further cause the gateway device to:
   identify a variable contained in the first node;
   identify symbol data describing the variable, the symbol data including a name of the variable and a value associated with the variable; and
   store the symbol data in a symbol table.

10. The tangible computer readable storage device or storage disc of claim 8, wherein the instructions further cause the gateway device to:
    determine context data associated with the statement, the context data describing a scope of the statement;
    cache the context data in a context table; and
    associate the context data in the context table with corresponding symbol data in the symbol table.

11. The tangible computer readable storage device or storage disc of claim 8, wherein the instructions further cause the gateway device to:
  determine if the first node includes a probe function; and
  in response to determining that the first node does not include the probe function, inserting the probe function in the first node.

12. The tangible computer readable storage device or storage disc of claim 8, wherein the instructions further cause the gateway device to determine if the statement in the first node is a simple statement, the simple statement being a statement having a basic language operator applied to a variable and a function code associated with a standard library of a programming language of the computer code.

13. The tangible computer readable storage device or storage disc of claim 9, wherein the instructions further cause the gateway device to:
  detect induced changes to the symbol data after executing the statement; and
  update the symbol table to reflect the induced changes to the symbol data.

14. The tangible computer readable storage device or storage disc of claim 8, wherein the instructions further cause the gateway device to, in response to the determination that the computer code is malicious, block the computer code.

15. A device comprising:
  a memory; and
  a processor configured to:
    parse computer code received from a non-trusted entity via a network, the computer code received by a gateway when sent by the non-trusted entity to a client device in response to a request from the client device;
    transform the parsed computer code into an abstract syntax tree, the abstract syntax tree containing a first node having a statement from the parsed computer code;
    analyze the statement in the first node to determine if the statement contains a user-defined function;
    in response to determining that the statement in the first node does not contain the user-defined function, executing the statement; and
    determine the computer code is malicious by comparing a result of the execution of the statement in the first node to a set of rules denoting malicious behavior.

16. The device of claim 15, wherein the processor is further configured to:
  identify a variable contained in the first node;
  identify symbol data describing the variable, the symbol data including a name of the variable and a value associated with the variable; and
  store the symbol data in a symbol table.

17. The device of claim 16, wherein the processor is further configured to:
  determine context data associated with the statement, the context data describing a scope of the statement;
  cache the context data in a context table; and
  associate the context data in the context table with corresponding symbol data in the symbol table.

18. The device of claim 16, wherein the processor is further configured to:
  determine if the statement in the first node is a simple statement, the simple statement being a statement having a basic language operator applied to a variable and a function code associated with a standard library of a programming language of the computer code.

19. The device of claim 16, wherein the processor is further configured to:
  detect induced changes to the symbol data after executing the statement; and
  update the symbol table to reflect the induced changes to the symbol data.

20. The device of claim 16, wherein the processor is further configured to, in response to the determination that the computer code is malicious, block the computer code.

* * * * *